US012170019B2

(12) United States Patent
Westh

(10) Patent No.: US 12,170,019 B2
(45) Date of Patent: Dec. 17, 2024

(54) DISTRESS SIGNAL SYSTEM FOR SEA VESSELS AND A METHOD THEREFOR

(71) Applicant: Peter Westh, Ekerö (SE)

(72) Inventor: Peter Westh, Ekerö (SE)

( * ) Notice: Subject to any disclaimer, the term of this patent is extended or adjusted under 35 U.S.C. 154(b) by 139 days.

(21) Appl. No.: 17/915,551

(22) PCT Filed: Mar. 26, 2021

(86) PCT No.: PCT/SE2021/050275
§ 371 (c)(1),
(2) Date: Sep. 29, 2022

(87) PCT Pub. No.: WO2021/201755
PCT Pub. Date: Oct. 7, 2021

(65) Prior Publication Data

US 2023/0138037 A1 May 4, 2023

(30) Foreign Application Priority Data

Mar. 30, 2020 (SE) .................................... 2030110-7

(51) Int. Cl.
*G08B 5/00* (2006.01)
*B63B 45/04* (2006.01)
*G08B 5/38* (2006.01)

(52) U.S. Cl.
CPC .............. *G08B 5/002* (2013.01); *B63B 45/04* (2013.01); *G08B 5/38* (2013.01); *B63B 2201/08* (2013.01)

(58) Field of Classification Search
CPC ............ G08B 5/002; G08B 5/38; B63B 45/04
See application file for complete search history.

(56) References Cited

U.S. PATENT DOCUMENTS 4,163,220 A 7/1979 Amann et al.
4,647,929 A 3/1987 Jacobs
(Continued)

FOREIGN PATENT DOCUMENTS

EP 2622 A2 6/1979
FR 2717599 A1 * 9/1995 .............. B60Q 1/52
GB 2530279 A 3/2016

OTHER PUBLICATIONS

International Patent Application No. PCT/SE2021/050275, International Search Report and Written Opinion mailed May 25, 2021, 11 pages.

(Continued)

*Primary Examiner* — Andrew W Bee
(74) *Attorney, Agent, or Firm* — FREDRIKSON & BYRON, P.A.

(57) ABSTRACT

A distress signal system for a sea vessel comprises several navigation lights (11, 12, 13, 14, 15), which are connected in an electrical circuit and arranged to emit a steady light in different directions in a normal operating state. The distress signal system comprises a control means (28, 30) connected to the electrical circuit which in a distress signal state is arranged to vary the current to the navigation lights (11, 12, 13, 14, 15) in order to vary the light emission therefrom in accordance with a distress signal, such as SOS. A manually actuatable actuator (24) is connected to the control means (28, 30) to activate or deactivate the distress signal state. A light activating means (26) is arranged to provide a varied power supply to the navigation lights (11, 12, 13, 14, 15) in connection with activating the distress state, regardless of whether these are in operating state or not. Such a distress signal system can be provided by connecting a separate distress signal unit comprising a control means to the navigation lights of a sea vessel.

21 Claims, 2 Drawing Sheets

(56) References Cited

U.S. PATENT DOCUMENTS

| | | | | |
|---|---|---|---|---|
| 7,794,124 | B2 | 9/2010 | Hulsey et al. | |
| 2005/0225976 | A1 | 10/2005 | Zampini et al. | |
| 2007/0241937 | A1 | 10/2007 | Horst et al. | |
| 2008/0247161 | A1 | 10/2008 | Hulsey et al. | |
| 2022/0194529 | A1* | 6/2022 | Covelli | G08B 5/36 |

OTHER PUBLICATIONS

European Patent Office, “Extended European Search Report” , From Application No. 21781102.5, Dated Apr. 24, 2024, pp. 1-13.

* cited by examiner

DISTRESS SIGNAL SYSTEM FOR SEA VESSELS AND A METHOD THEREFOR

RELATED APPLICATIONS

This application is a 35 U.S.C. 371 national phase filing from International Application No. PCT/SE2021/050275, filed Mar. 26, 2021, which claims priority to SE Application No. 2030110-7, filed Mar. 30, 2020, the teachings of which are incorporated herein by reference.

TECHNICAL FIELD

The present invention relates to a distress signal system, a distress signal unit, a naval vessel provided with such a system or unit, and a method for indicating a distress situation on a naval vessel.

BACKGROUND

Naval vessels, such as ships and boats of various kinds, have long used different navigation lights to make the vessel visible and to prevent collisions. The navigation lights used for this purpose are usually called lights. Both national and international regulations regulate the design and use of navigation lights for different ships and in different situations. Ships have a green light on the starboard side and a red light on the port side, as well as different variants of white lights and all-round lights depending on the type of vessel. Navigation lights are intended to be used with a steady light in the dark and in poor visibility. Normally, they only have an activated, illuminated mode and an inactive, off mode.

In the event of distress at sea, there are various established signaling options such as radio signaling, sound signals, parachute flares, hand flares and distress flags at hand. However, the known ways of generating sound and light signals have disadvantages as they require special equipment which must be retrieved in a distress situation and which must be handled manually. An example of this is shown in U.S. Pat. No. 4,163,220 A, which describes a signal lamp for distress at sea, which lamp is arranged to signal SOS with Morse code to nearby ships or land. This, and other similar solutions of the headlight type have, among other things, the disadvantage that one has to identify another ship and direct one-self towards it in order to attract its attention, since the distress light is in principle only visible in one direction.

US 2005/0225976 A1 describes a LED light network for ships with the possibility to control a number of different lightings on ships via a digital electrical network. Automatic control of different light effects in response to different input signals in the network is also described, for example it is stated that the exterior lighting of a ship can be made to flash in accordance with Morse code, as an automatic response to a signal in the network indicating a state of distress. The solution is complicated and difficult to apply to smaller boats, which often lack exterior lighting. In addition, a digital network is required for the implementation of this solution. The network is also not suitable for use on existing sea vessels with an existing electrical circuit.

US 2007/0241937 A1 describes a system for controlling sound and light signals of a ship at limited visibility. The system comprises a control panel with a number of buttons and indicators and can initiate a number of different combinations of sound and light signals, including an SOS signal according to Morse code. However, in order to put the system in a distress state and send out distress signals, a user must use several different pushbuttons and make a number of different keystrokes in sequence and also make a number of decisions, before a distress signal is sent out. The system is intended to be connected to a lighting device with all-round white light, either an existing lighting device or a special separate lighting device, which also can serve as an anchor light. If the system is connected to an existing lighting device, which can also be switched on and off in another way, it must be ensured in the event of a distress signal that this lighting is not switched on, otherwise no distress signal will be emitted.

For situations in daylight, it is also possible to hoist distress flags to call for help in the immediate area, but this is an extra step and has almost no effect in the dark. Furthermore, parachute flares and hand flares have the disadvantage that they have a limited lighting time and are consumed during use. For parachute flares, which are visible from a distance, the problem also applies that, based on the flare's position, it can be difficult to determine which of several ships are in distress, which can delay rescue operations.

The person in distress is often busy with other things than calling for help. The vessel may take in water and the leak must be located and stopped. Any fire must be extinguished, and any injured people must receive first aid. Someone may have fallen overboard and must be found and recovered. Every extra step to call for help in the immediate area in that situation may have fatal consequences.

External relief efforts that have been reached by a distress signal of some kind and are on their way to a ship in distress, may have difficulty immediately distinguishing which one of several surrounding ships that is in distress.

SUMMARY

The object of the present invention is to solve problems with existing signaling systems for sea vessels in distress. In particular, the object of the invention is to provide a simply activatable signaling system for sea vessels in distress, which clearly indicates to a surrounding that a vessel is in distress, at the same time as the handling thereof does not require large efforts from the crew of the vessel.

According to a first aspect of the invention, it is located in a distress signal system for a sea vessel which has two or more navigation lights, which are interconnected in an electrical circuit and arranged to emit a solid light in different directions in an operating state. The invention is characterized by

- a control means coupled to the electrical circuit, which control means is arranged to vary the current to the navigation lights in a distress signal state in order to vary the light emission therefrom according to a pre-programmed pattern to form a well-established distress signal, preferably the Morse code for SOS,
- a manually activatable actuator comprising a switch connected to the control means for activating or switching off the distress signal state by activating or deactivating the control means, and
- a light activating means coupled to the electrical circuit, which is arranged to provide, when activated, a power supply of said varying current to said navigation light, in connection with activating the distress state, regardless of whether said navigation light is in operating state or not.

This enables the existing navigation lights on a sea vessel, such as a ship or a boat, to be pulsed or flashed in a simple manner. Flashing signals are themselves a good way to attract attention visually, and flashing lights are intuitively interpreted as something deviating. By using the existing navigation lights, it is possible, at a very low extra cost, to create an easily observable light effect in all directions, as normal navigation lights together are omnidirectional and also visualizes the position and direction of the distressed vessel. A further advantage of the invention is that the normal function of the navigation lights remains.

By emitting a well-established distress signal by means of the navigation lights, it is further clarified to the surroundings that the ship transmitting the signals is in distress. It is particularly advantageous that the navigation lights are made to pulsate or flash in accordance with the familiar Morse code for SOS, i.e. three short, three long and three short flashes.

Thanks to the manually activatable actuator, a distress signal can easily be started by someone in the ship's crew or even by a passenger, whereafter the emergency signal continues for the time being by the navigation lights continuing to flash.

Thanks to the light activating means, the advantage is achieved that the navigation lights can be set in distress signal state regardless of whether the navigation lights previously are in operating mode, i.e., switched on, or in the deactivated mode. Preferably, all navigation lights are flashed, in connection with activation of the distress mode.

In connection with the invention, the word sea/naval vessel refers to all boats and ships, regardless of size, propulsion technology and area of use. This refers to recreational boats as well as passenger ships and commercial ships of various types.

The invention relates to use on sea vessels with several navigation lights, preferably two or more. Although the inventive concept can be applied to sea vessels with everything from one navigation light and upwards, it should be noted that greater benefits are achieved when used on ships with two or more navigation lights, partly because single navigation lights are only used on smaller recreational boats, partly since a better effect is achieved when more than one navigation light flashes, and not least since it is clear that the navigation lights belong to a sea vessel when green and red side navigation lights also flash. In particular, the invention is intended for ships which, in accordance with national and international maritime regulations, must carry navigation lights.

The actuator according to the invention is arranged to be activated manually by the crew or passengers. However, it should also be noted that the actuator, within the scope of the inventive concept, also can be activated by a signal received from elsewhere, such as a signal indicating a distress condition from a safety system on the sea vessel.

In a preferred embodiment, the actuator is further connected to a preventing means, intended to prevent unintentional operation of the actuator. The preventing means is arranged to prevent activation of the operating means during normal operation and must first be released to allow the actuator to be moved to the active position. This ensures that the actuator is not activated by mistake, in order to avoid that distress signals are incorrectly transmitted.

In a further preferred embodiment, the distress signal system has an indicator, such as a light indicator or a sound indicator, to indicate when the system is in a distress signal state. This allows you to easily get confirmation that the distress signal state has been activated. Particularly advantageous is an embodiment in which a light indicator and/or a sound indicator is arranged to vary in accordance with the light of the navigation lights, as this also clearly illustrates the flashing function of the signal system. It is particularly advantageous that the indicator is electrically connected to the navigation lights in order to confirm the function of the system in the distress signal state with its light and/or sound. A light indicator is particularly preferred.

According to a particular aspect of the invention, it relates to a distress signal unit intended for a sea vessel, which has one or more navigation lights which are interconnected in an electrical circuit and which are arranged to emit a steady light in different directions in an operating state. The distress signal unit has a body with connection points for being electrically connectable to the navigation lights. Furthermore, the distress signal unit has a control means attached to the body, which control means is arranged to vary the current to the navigation lights in a distress signal state, thereby varying the light radiation from these in accordance with a pre-programmed pattern to form a well-established distress signal, preferably the Morse code for SOS, when the distress signal unit is connected to the navigation lights. The distress signal unit further has a manually activatable actuator, which comprises a switch connected to the control means for activating or switching off the distress signal state by activating or switching off the control means. In addition, the distress signal unit has a light activating means connectable to the electrical circuit, which light activating means is arranged to provide, when activated, power supply of said varying current to the navigation lights, in connection with activation of the distress state, regardless of whether the navigation lights are in operating state or not.

By producing a separate distress signal unit that is connectable to an existing navigation light system, the possibility of applying the invention on existing sea vessels with navigation lights is advantageously enabled. Furthermore, the cost of implementing the inventive concept can be kept low by producing separate distress signal units for retrofitting on ships. A separate distress signal unit according to the above also provides great advantages in new production, since navigation light systems and distress signal unit can be manufactured separately and mounted separately, while working together after mounting on a sea vessel. This results in efficient production and installation.

It will be understood from the description above that all the advantages and functions described in connection with the distress signal system according to the invention also can be reached with a distress signal unit described above when it is connected to navigation lights on a sea vessel.

In a preferred embodiment of the distress signal unit, the actuator is advantageously arranged in a separate physical unit so that the body and the actuator can be placed physically separated on the sea vessel. It is advantageous that the actuator thus can be placed in a location where it easily can be activated manually, whereby the body can be placed in a location which is suitable from an installation perspective.

Furthermore, in a preferred configuration, the distress signal unit also comprises an indicator for indicating when the system is in a distress state. This unit is also advantageously arranged in a separate physical unit in relation to the body, such that it can be arranged in a location which is suitable for indicating when the system is in a distress signal state and a distress signal is transmitted. The actuator and the indicator may advantageously be arranged in a common physical unit.

According to a further aspect of the invention, it comprises a sea vessel having a distress signal system or a distress signal unit according to any of the above described aspects of the invention.

According to a particular aspect of the invention, it is a method for indicating distress at sea on a sea vessel, wherein navigation lights on the vessel are caused to emit a pulsating light, preferably in accordance with Morse code for SOS, by means of a distress signal system or a distress signal unit according to any one of the above described aspects of the invention.

The inventive concept can also be described as the use of a sea vessel's navigation light to attract attention and indicate that the vessel is in distress at sea by flashing these navigation lights, advantageously by signaling Morse code for SOS.

DESCRIPTION OF THE DRAWINGS

In the following, the invention is described in more detail with reference to a preferred embodiment of the invention with reference to the accompanying drawings.

DETAILED DESCRIPTION OF AN EMBODIMENT

Figure 1:
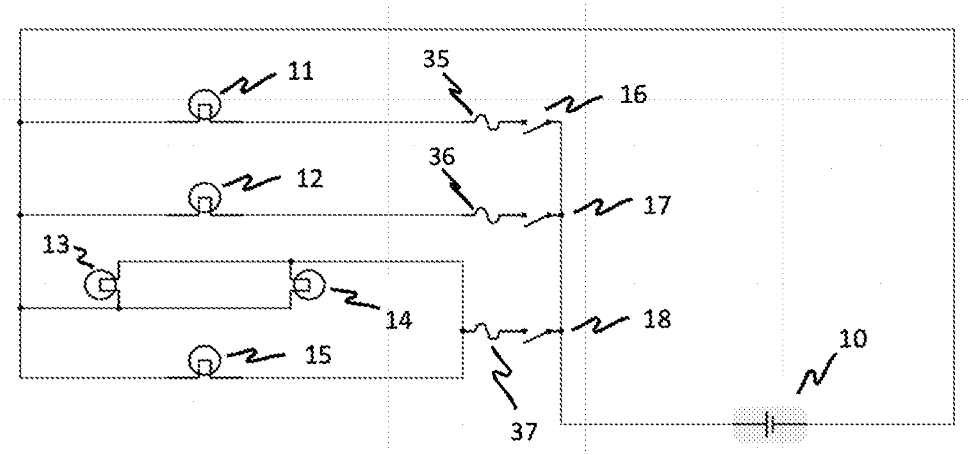
FIG. 1 shows a wiring diagram for navigation lights on a sea vessel in accordance with known technology.

With reference to FIG. 1, a typical installation of navigation lights on a sea vessel in the form of a smaller vessel is briefly described below. The wiring diagram shows an electrical power source, here in the form of a 12 V battery 10, which is connected to and arranged to power the ship's navigation lights. The navigation lights, which follow Swedish and international maritime regulations, include in the example two side lights, one port light 13 and one starboard light 14. The side lights 13, 14 are arranged to emit light sideways and forward, red light in a sector of 112.5° in the port and forward direction for the port light 13, and green light in a sector of 112.5° in the starboard and forward direction for the starboard light 14. The navigation lights further comprise a stern light 15 arranged to emit white light backwards and sideways in a sector of 135°. The lights 13, 14, 15 are connected in parallel with the battery 10 via a common switch 18 and a fuse 37. The circuit further comprises a steamer light 12, arranged to emit white light in the forward direction in a sector of 225° at engine operation. The steamer light 12 is connected to the battery 10 via a separate switch 17 and a fuse 36. In addition, the circuit comprises an anchor light 11, arranged to emit 360° white light during anchoring. This is also connected to the battery via a switch 16 and a fuse 35. All navigation lights are thus connected in parallel.

Figure 2:
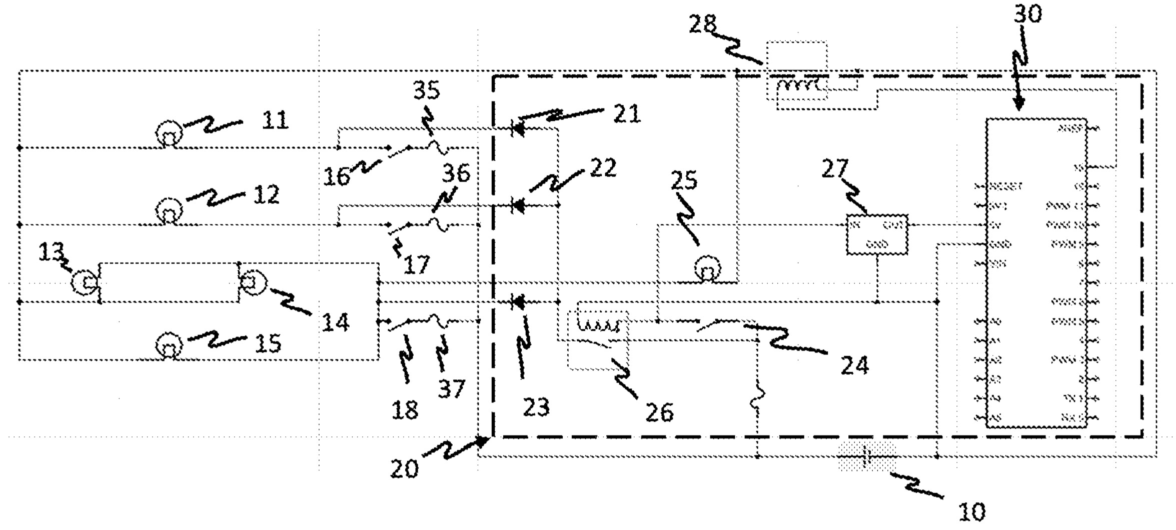
FIG. 2 shows a wiring diagram for a sea vessel equipped with a sea safety system in accordance with the invention.

With reference to FIG. 2, a description is given in the following of a preferred embodiment of the invention. The parts belonging to a standard navigation light installation described with reference to FIG. 1 are shown here with the same reference numerals 10, 11, 12, 13, 14, 15, 16, 17, 18, 35, 36, 37 and are therefore not described in more detail below.

FIG. 2 shows a navigation light installation with a distress signal system according to the invention. In addition to the previously described navigation lights 11, 12, 13, 14, 15, the switches 16, 17, 18 and the battery 10, the system comprises a distress signal unit, generally designated 20, in connection with the navigation lights. The distress signal unit 20 comprises a switch 24 for switching on and off distress signals via the navigation lights 11, 12, 13, 14, 15. The switch further has a built-in indicator, here in the form of a LED lamp 25, which indicates with flashing lights when the system is in operation. The use of a LED lamp in this context has clear advantages as the indicator can be made small, is reliable during a long time, has a low cost and has extremely low power consumption.

Furthermore, the signal unit has a relay 26 which is switched off during normal operation of the navigation lights but is closed when the switch 24 is switched on and thereby switches on the lights 11, 12, 13, 14, 15 on. In the example, the relay 26 is connected between the positive pole of the battery 10 and the respective parallel-connected navigation lights 11, 12, 13, 14, 15.

Diodes 21, 22 and 23 are connected between the relay 26 and the respective lights 11, 12, 13, 14, 15 such that diode 21 is connected in parallel with switch 16, diode 22 is connected in parallel with switch 17 and diode 23 is connected in parallel with switch 18. The diodes 21, 22, 23 have the task of ensuring that no more lights than desired are lit when each of the normal switches 16, 17, 18 is closed for operation of one or more lights.

Between the lights 11, 12, 13, 14, 15 and the negative pole of the battery 10 (and the ground of the ship) a second relay 28 is arranged, which is configured to vary the current in the circuit when the switch 24 closes the circuit and activates the safety system. This causes the lights 11, 12, 13, 14, 15 to flash and indicate that the ship is in distress at sea. It should also be noted that the relay 28 is closed in the passive position and does not load the navigation light circuit in normal operating modes, but only loads the circuit in the distress signal state. The relay 28 is further connected to receive a control signal from a programmable control unit 30, also referred to as microcontroller, which has a plurality of connections. A voltage regulator 27 is also connected to the control unit 30 to ensure a voltage of 5 volts to the control unit 30. The voltage regulator 27 has three connections and is connected to the 5-volt connection of the control unit 30, to the negative terminal (ground) of the battery 10 and to the switch 24.

The control unit 30 is connected via a ground connection to the negative pole of the battery 10 and at a 5-volt connection to the voltage regulator 27. At the connection point of the control unit, marked "13", it is connected to a control side of the relay 28. In this embodiment, the control unit 30 together with the relay 28 forms a control means according to the invention, and the control unit 30 is arranged to vary, together with the relay 28, the current through the navigation lights 11, 12, 13, 14, 15 such that these are caused to pulsate or flash. In the described embodiment, the navigation lights are caused to flash in accordance with the Morse code signal for SOS, i.e., three short light signals, three longer light signals, and three short light signals, which are then repeated.

The control means described in the illustrative example is formed by a programmable control unit, which together with a relay provides a variation of the current through the lights. It should be understood, however, that there are a number of other possibilities for those skilled in the art to provide a control means which can vary the current in the circuit of the lights and produce a pulsating or flashing effect thereof. Various simple relay solutions or mechanical solutions are available, for example. It should also be noted that the described embodiment enables, thanks to the relay 26 and the diodes 21, 22, 23, activation of a distress light function without the navigation lights being switched on separately. For simpler solutions, switching on the navigation lights may also be required to activate the distress light functionality.

Figure 3:
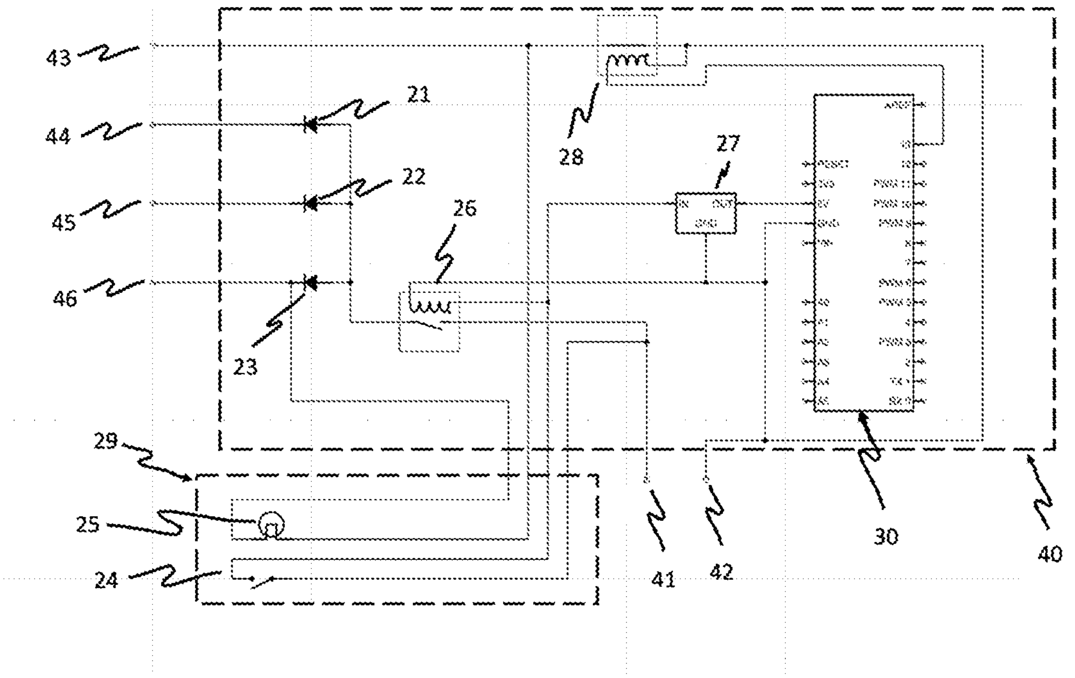
FIG. 3 shows a wiring diagram for a distress signal unit according to the invention.
Figure 4:
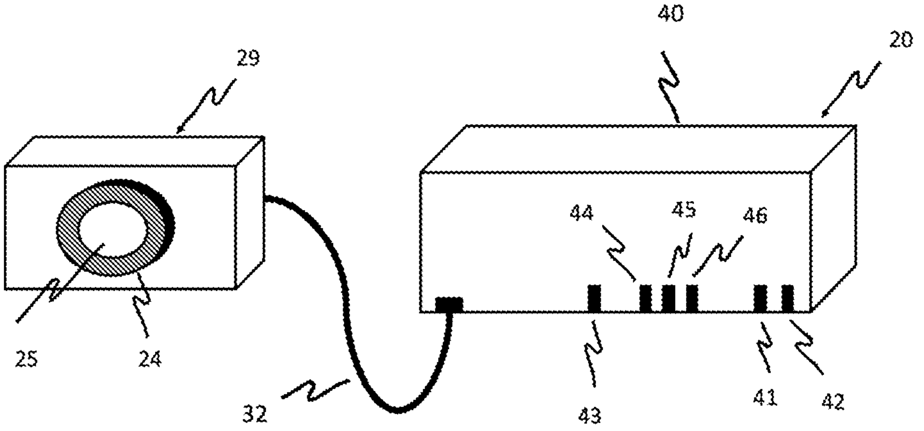
FIG. 4 shows an overview of a distress signal unit according to the invention.

FIG. 3 shows a wiring diagram for a separate distress signal unit 20, which is intended to form the distress signal system according to the invention together with a standard navigation light installation. FIG. 4 schematically shows the physical design of an embodiment of the distress signal unit 20. The same reference numerals as in FIGS. 1 and 2 are used for corresponding parts in FIGS. 3 and 4, the parts described above not being described in more detail in the following. The parts shown in FIGS. 3 and 4 are also apparent from the dashed circumference indicated in FIG. 2, generally denoted by the reference numeral 20.

The distress signal unit 20 differs most closely from the solution shown in FIG. 2 in that connection points for connection to different positions in a navigation light circuit are defined. Thus, the distress signal unit has two connection points 41 and 42, respectively, for connection to a power source, such as a battery, wherein connection point 41 is intended to be connected to the positive pole of the power source and the connection point 42 is intended to be connected to the negative pole (ground) of the power source. Furthermore, the distress signal unit has a connection point 46 for connection to one side (positive side) of an assembly of the port side light 13, starboard side light 14 and stern side light 15, and a connection point 45 for connection to one side (positive side) of a steamer light 12, and furthermore a connection point 44 for connection to one side (positive side) of an anchor light 11. In addition, the distress signal unit has a connection point 43 for connection to the other side (ground side) of the said s navigation lights 11, 12, 13, 14, 15.

As can be seen in FIG. 4, all connection points 41, 42, 43, 44, 45, 46 of the example are arranged on a body associated with the distress signal unit, here in the form of a housing 40. On the inside of the housing 40, the control unit 30, also shown in FIG. 3, the voltage regulator 27, the two relays 26 and 28 and the diodes 21, 22, 23 are fixed (not shown in FIG. 4), as is shown by the dashed circumference 40 in FIG. 3. It is to be understood that the number of connection points and different functions can be varied in adaptation to different navigation lighting solutions and ships.

As is further shown in both FIG. 3 and FIG. 4, the actuator 24 and the indicator lamp 25 are arranged in a separate unit, physically separated from the housing 40. In the shown solution, both the actuator 24 and the indicator lamp 25 are arranged in a common housing 29, which is connected to the housing 40 by means of a cable 32 containing the electrical connections between the unit 20 and the unit 29 in accordance with FIG. 3. In the shown embodiment, the actuator is designed as a pushbutton 24 and the indicator 25 is arranged in the pushbutton 24. However, it should be understood that various technical solutions are available for the realization of an actuator and an indicator according to the invention. According to the invention, it is also suitable to provide a preventing means (not shown) to ensure that the actuator cannot be activated by mistake. This can be realized, for example, by a transparent lid which is placed over the pushbutton 24 and which is arranged such that it must be lifted before the pushbutton is activated. It is to be understood, however, that a number of possibilities for the design of actuator, locking means and indicator are at hand within the scope of the appended claims.

In a particular variant of the signal system and the signal unit according to the invention, a control means connected to the navigation lights can also be used for alarm situations other than distress at sea by causing the signal unit to control the navigation lights to variation in response to an alarm signal from a detector belonging to the ship. An applicable situation where this solution is advantageous is detection of a leak or burglary on ships that are unmanned in port. The surroundings can then be made aware that something is wrong.

The invention as defined by the claims has been explained above by means of a description of a preferred embodiment. It is to be understood, however, that the scope of the invention is not limited by the described embodiment but may be varied within the scope of the appended claims. It will thus be appreciated that the electrical circuit to achieve a variation of the light intensity can be designed in a variety of ways and by means of different components. It should also be understood that the light variation achieved according to the invention is not limited to an SOS signal but that the necessary attention related to sea distress also can be achieved in other ways. The invention is also not limited to a 12 V battery, but other current sources and operating voltages suitable for each vessel type may just as well be considered. Furthermore, the solution of the invention can also be advantageously supplemented with a specific battery for distress operation, in order to ensure that the distress signal system is functional even if ordinary electrical power supply has been eliminated. Further advantageous embodiments may comprise additional distress aids connected to and activated by means of the actuator. This can refer to additional lighting aids in addition to the navigation lights, sound signals or activation of disposable aids such as parachute flares or the like. Furthermore, the system can be activated by means of another system on the ship.

The invention claimed is:

1. A distress signal system for sea vessels comprising two or more navigation lights, which are interconnected in an electrical circuit and arranged to emit a steady light in different directions in an operating state, characterized in that the system further comprises:

a control means connected to the electrical circuit, which control means is arranged to vary the current to the navigation lights in a distress signal state in order to vary the light emission therefrom according to a pre-programmed pattern for formation of a well-established distress signal;

a manually actuatable actuator comprising a switch connected to the control means for activating or switching off the distress signal state by activating or switching off the control means; and a light activating means coupled to the electrical circuit, which light activating means is arranged to provide, when activated, a power supply of said varying current to said navigation light, in connection with activation of the distress condition, regardless of whether said navigation light is in operating state or not; wherein the electrical circuit comprises at least two circuits, the at least two circuits being connected in parallel, wherein each of the at least two circuits is connected to a power source via an electrical switch, and wherein the light activating means is connected to the power source and each of the at least two circuits and is arranged to electrically bypass each electrical switch.

2. The distress signal system according to claim 1, wherein the actuator is arranged to be activated in response to an alarm signal from a detector indicating a distress condition.

3. The distress signal system according to claim 2, wherein the actuator further is connected to a preventing means for preventing accidental activation of the actuator.

4. The distress signal system according to claim 3, comprising an indicator for indicating when the system is in a distress signal state.

5. The distress signal system according to claim 4, wherein the indicator is a light indicator arranged to vary in accordance with the light of the navigation lights, the light indicator preferably being electrically connected to the navigation lights to confirm with its light the function of the system in distress signal condition.

6. The distress signal system according to claim 2, comprising an indicator for indicating when the system is in a distress signal state.

7. The distress signal system according to claim 6, wherein the indicator is a light indicator arranged to vary in accordance with the light of the navigation lights, the light indicator preferably being electrically connected to the navigation lights to confirm with its light the function of the system in distress signal condition.

8. The distress signal system according to claim 1, comprising an indicator for indicating when the system is in a distress signal state.

9. The distress signal system according to claim 8, wherein the indicator is a light indicator arranged to vary in accordance with the light of the navigation lights, the light indicator preferably being electrically connected to the navigation lights to confirm with its light the function of the system in distress signal condition.

10. The distress signal system according to claim 1, wherein the light emission is varied in accordance with the Morse code for SOS.

11. The distress signal system according to claim 1, wherein each bypass of the electrical switches includes a diode arranged so that each diode is connected in parallel with each corresponding electrical switch.

12. Sea vessel comprising a distress signal system according to claim 1.

13. A method for indicating distress at sea on a sea vessel, wherein navigation lights on the vessel are caused to emit a pulsating light by means of a distress signal system according to claim 1.

14. The method according to claim 13, wherein the pulsating light is emitted in accordance with the Morse code for SOS.

15. A distress signal unit intended for sea vessels having two or more navigation lights interconnected in an electrical circuit and arranged to emit a steady light in different directions in an operating state, characterized in that the distress signal unit has a body with connection points for electrical connection to the navigation lights and that the distress signal unit has a control means attached to the body, which control means is arranged to vary the current to the navigation lights in a distress signal state when the distress signal unit is connected to the navigation lights in order to vary the light emission therefrom in accordance with a pre-programmed pattern to form a well-established distress signal, that the distress signal unit further has a manually activatable actuator, which comprises a switch connected to the control means for activating or switching off the distress signal state by activating or switching off the control means, and that the distress signal unit further has a light activating means connectable to the electrical circuit, which light activating means is arranged to provide, when activated, power supply of said varying current to said navigation lights, in connection with activation of the distress state, regardless of whether said navigation lights are in the operating state or not; wherein the electrical circuit comprises at least two circuits, the at least two circuits being connected in parallel, wherein each of the at least two circuits is connected to a power source via an electrical switch, and wherein the light activating means is connected to the power source and each of the at least two circuits and is arranged to electrically bypass each electrical switch.

16. The distress signal unit according to claim 15, wherein the actuator preferably is arranged in a separate physical unit.

17. The distress signal unit according to claim 16, wherein the unit comprises an indicator for indicating when the system is in an emergency a distress state.

18. The distress signal unit according to claim 15, wherein the light emission is varied in accordance with the Morse code for SOS.

19. Sea vessel comprising a distress signal unit according to claim 15.

20. A method for indicating distress at sea on a sea vessel, wherein navigation lights on the vessel are caused to emit a pulsating light by means of a distress signal system according to a distress signal unit according to claim 15.

21. The method according to claim 20, wherein the pulsating light is emitted in accordance with the Morse code for SOS.

* * * * *